(12) United States Patent
Fries

(10) Patent No.: US 6,641,128 B2
(45) Date of Patent: Nov. 4, 2003

(54) CLAMPING APPARATUS WITH A CLAMPING CHUCK AND A WORK PIECE CARRIER RELEASABLY CONNECTABLE THERETO

(75) Inventor: Karl Fries, Reinach (CH)

(73) Assignee: Erowa AG, Reinach (CH)

( * ) Notice: Subject to any disclaimer, the term of this patent is extended or adjusted under 35 U.S.C. 154(b) by 0 days.

(21) Appl. No.: 10/385,149

(22) Filed: Mar. 10, 2003

(65) Prior Publication Data

US 2003/0168795 A1 Sep. 11, 2003

(51) Int. Cl.[7] ................................................ B23Q 3/00
(52) U.S. Cl. ..................... 269/309; 279/4.06; 279/33 P; 269/310
(58) Field of Search ................................ 403/13, 322.1, 403/322.2, 14, 15; 269/309, 310, 900; 92/86, 171.1; 279/4.06

(56) References Cited

U.S. PATENT DOCUMENTS

| | | | | | |
|---|---|---|---|---|---|
| 5,190,272 A | * | 3/1993 | Zika et al. | ................... | 269/309 |
| 5,415,384 A | * | 5/1995 | Obrist et al. | ................. | 269/309 |
| 5,918,870 A | * | 7/1999 | Stark | .......................... | 269/309 |
| 6,073,325 A | * | 6/2000 | Stark | .......................... | 29/33 P |
| 6,139,002 A | * | 10/2000 | Stark | .......................... | 269/309 |
| 6,170,836 B1 | * | 1/2001 | Etter | ......................... | 279/4.06 |

\* cited by examiner

*Primary Examiner*—Joseph J. Hail, III
*Assistant Examiner*—Daniel Shanley
(74) *Attorney, Agent, or Firm*—Maginot, Moore & Bowman

(57) ABSTRACT

In a clamping apparatus for fixing a work piece carrier with a clamping pin in a clamping chuck, the clamping chuck is provided with a central opening for receiving the clamping pin and with a clamping mechanism firmly keeping the clamping pin in the central opening. The central opening has a conical inserting portion, and the clamping pin comprises a rear section with exposed aligning surfaces, engaging the conical inserting portion, to align the clamping pin with regard to the clamping chuck in X- and/or Y-directions. Circular seat portions on top of the clamping chuck constitute the Z-stop for the work piece carrier. For pneumatically cleaning the exposed aligning surfaces, the conical inserting portion is provided with gas outlet openings, located corresponding to the arrangement of the exposed aligning surfaces. The surface areas of the work piece carrier that will rest on the seat portions are pneumatically cleaned by gas outlet openings located in the center of the seat portions.

13 Claims, 3 Drawing Sheets

CLAMPING APPARATUS WITH A CLAMPING CHUCK AND A WORK PIECE CARRIER RELEASABLY CONNECTABLE THERETO

BACKGROUND OF THE INVENTION

The present invention refers to a clamping apparatus with a clamping chuck and a work piece carrier having a clamping pin. Particularly, the apparatus of the invention comprises a clamping chuck and a work piece carrier adapted to be releasably connected to the clamping chuck, the work piece carrier having a flat bottom surface and comprises a clamping pin protruding from the flat bottom surface.

The clamping chuck is provided with a central opening for receiving the clamping pin of the work piece carrier, the central opening having a conical inserting portion, and a clamping mechanism for clampingly fixing the clamping pin of the work piece carrier in the central opening of the clamping chuck.

Such a clamping apparatus is preferably used for clamping work piece carriers equipped with one or several work pieces to be machined in the machining area of a machine tool in a well-defined and predetermined position. Usually, the clamping chuck of the apparatus is fixed in the machining area of the machine tool, while the work piece carrier, provided with a clamping pin, is releasably attached to the clamping chuck.

In order to be in a position to clamp work pieces with different dimensions, so-called palletizing systems are known which comprise a plurality of clamping chucks, usually two, four, six or eight of them. By means of these plurality of clamping chucks, a work piece carrier equipped with, depending on its size, two, four, six or eight clamping pins can be clamped. In certain cases, it may happen that the work piece carrier is equipped with an odd number of clamping pins. Since an individual clamping chuck usually comprises neither means to avoid a rotation of the clamping pin nor means for determining the angular position of the clamping pin around the Z-axis, it can be advantageous to provide one or several clamping chucks with positioning means, determining besides the X- and Y-positions also the angular position around the Z-axis, with the result that, if appropriate, also work piece carriers having but one clamping pin can be clamped to the clamping chuck in an exactly defined linear and angular position. It is understood that in such a case also the work piece carrier has to be provided with positioning means cooperating with the above mentioned positioning means of the clamping chuck.

The accuracy of the relative position between work piece carrier and clamping chuck can be severely impaired particularly by contamination of the elements of the apparatus responsible for the fine positioning. Predominantly in the case of conical centering and positioning surfaces, respectively, there is a danger that dirt particles adhere to or are deposited on the conical inserting portion and/or the conically shaped aligning surface of the clamping pin.

PRIOR ART

The document DE 41 10 857 discloses an apparatus for coupling a tool holder to a working spindle of a machine tool. The working spindle is provided with an opening for receiving a shaft portion of the tool holder. The opening has an upper and a lower conical portion with an annular recess having a supporting surface located between the two conical portions. The shaft portion of the tool holder is equipped with two cone rings supported by elastic abutments. Between the two cone rings, a locking mechanism is located, comprising two radially movable locking pieces. On the top, these locking pieces are provided with wedge shaped surface areas that rest in the locked state on the supporting surface of the annular recess. By providing the elastic abutments, the cone rings are axially movable relative to the shaft portion of the tool holder and enable the shaft portion to be pulled in into the opening after the cone rings having been rested on the conical portions of the opening. The cone rings themselves are provided with slots. The shaft portion is provided with a flange portion constituting at its lower end a flat annular surface serving as a Z-direction stop member, resting on the front face of the working spindle upon clamping the shaft portion. In the opening of the working spindle, both conventional clamping pins (FIG. 5) and sectional clamping pins (FIGS. 1 and 3) can be clamped. Thus, the basic idea of that invention may be seen in the fact that work piece carriers with differently designed clamping pins can be clamped by the working spindle of the machine tool. It is understood that such a clamping apparatus is not at all suitable for attaching a work piece holder to the working spindle of a machine tool in a highly accurate and repeatable manner.

U.S. Pat. No. 5,961,261 discloses a clamping system with a clamping cylinder for pulling-in and clamping a pull-in nipple. The clamping cylinder is provided with a central bore for receiving the pull-in nipple. The nipple itself is provided with centering surfaces to ensure proper positioning inside the central bore of the cylinder. Additionally, it is provided with at least one cutting means, in the form of a cutting surface or a cutting edge. Should any chips stick to the nipple or to the centering surfaces of the cylinder, these chips are cut and removed. The cutting means on the nipple may be extending radially and comprising several independent cutting edges, or may be extending circumferentially. The clamping cylinder is provided with a plurality of uniformly distributed gas outlet openings, leading into free spaces between the cutting edges. By providing these free spaces, the region in front of the outlet openings 14, 15 shall be kept free of dirt particles, thereby avoiding a contamination of the outlet openings. In the region of the centering surfaces, however, no gas outlet openings are provided.

U.S. Pat. No. 5,415,384 discloses an apparatus for clamping a work piece at a workstation of a machining apparatus in a well-defined position. The apparatus comprises a base and a work piece carrier adapted to be put onto and fixed to the base. The base is provided with four centering rulers, engaging in each case a plate member provided with a groove and being elastically resilient in Z-direction in order to align the work piece carrier in X- and Y-directions. For clamping the work piece carrier to the base, separate clamping pins are provided which, however, do not have any centering or aligning function.

Finally, German patent document DE 200 21 407 discloses a clamping apparatus for fixing a pull-in bolt on a machine table. This clamping apparatus comprises a base plate, having a piston inserted into it, covered by a cover plate screwed to the base plate. The top surface of the cover plate comprises seat portions serving as Z-stop members. The base plate is provided with air channels, centrally opening into the seat portions and adapted to clean the surfaces thereof.

OBJECTS OF THE INVENTION

It is an object of the present invention to provide an improved clamping apparatus comprising a clamping chuck and a work piece carrier adapted to be releasably connected to the clamping chuck in which the surface areas responsible for the accuracy of the relative position between work piece carrier and clamping chuck are easily kept free of contamination.

SUMMARY OF THE INVENTION

In order to meet this and other objects, the present invention provides a clamping apparatus, comprising a clamping chuck and a work piece carrier adapted to be releasably connected to the clamping chuck. The work piece carrier has a flat bottom surface and comprises a clamping pin protruding from the flat bottom surface.

The clamping chuck has a central opening for receiving the clamping pin of the work piece carrier with a conical inserting portion and a clamping mechanism for clampingly fixing the clamping pin of the work piece carrier in the central opening. The clamping pin comprises a rear section adjacent to the flat bottom surface of the work piece carrier, having several exposed surface portions adapted to engage the conical inserting portion of the central opening for aligning the position of the clamping pin in X- and/or in Y-directions.

Moreover, the clamping chuck is provided with gas outlet openings located in the conical inserting portion of the central opening for blowing a gaseous medium against the exposed surface portions to thereby clean the surfaces thereof upon inserting the clamping pin into the central opening of the clamping chuck.

Thus, one of the basic ideas of the present invention is to ensure a fine positioning of the clamping pin not by means of large positioning surfaces, but to provide the clamping pin with a number of small, exposed aligning surface portions having but a limited extension, by means of which the clamping pin is accurately aligned in X- and/or Y-directions at the conical inserting portion of the central opening in the clamping chuck. These small exposed aligning surface portions can easily be kept clean by blowing air or another gaseous medium out of openings provided at corresponding locations in the conical inserting portion. Since these aligning portions both are exposed and of small dimensions, blowing pressurized air there against ensures a thorough and very efficient cleaning.

BRIEF DESCRIPTION OF THE DRAWINGS

In the following, embodiments of the apparatus according to the invention will be further described, with reference to the accompanying drawings, in which.

DETAILED DESCRIPTION OF PREFERRED EMBODIMENTS

Figure 1:
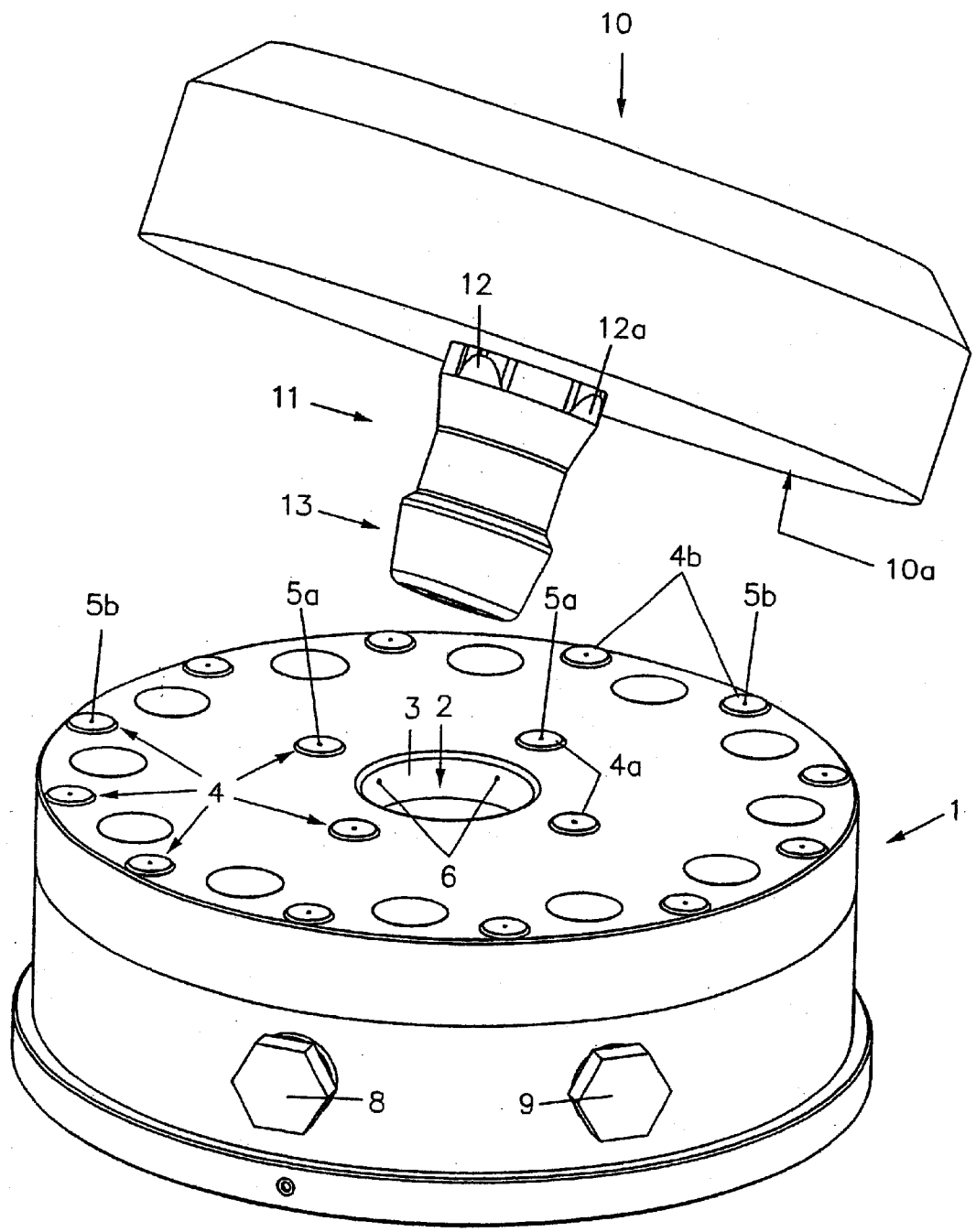
FIG. 1 shows a perspective view of a clamping chuck and of a work piece carrier.

FIG. 1 shows a perspective view of a schematically shown clamping apparatus according to a first embodiment of the invention. The clamping apparatus comprises a clamping chuck, generally designated by reference numeral 1, as well as a work piece carrier 10, generally designated by reference numeral 10, and provided with a clamping pin 11 adapted to clamp the work piece carrier 1 to the clamping chuck 10. In the present example, the work piece carrier simultaneously constitutes the work piece itself.

The clamping chuck 1, to be attached to the work table of a machine tool with the help of not shown fastener means, is provided with a central opening 2 adapted to receive and fix the clamping pin 11 in the clamping chuck 1. An upper portion of the central opening 2 is conically shaped to constitute a conical inserting portion 3. The top surface of the clamping chuck is provided with a plurality of seat portions 4 on which the bottom flat surface 10a of the work piece carrier 10 is to rest once the work piece carrier 10 having been finally clamped to the clamping chuck 1. Thus, the entirety of the seat portions 4 constitutes a Z-direction stop member for the work piece carrier 10.

The circularly shaped seat portions 4 are arranged in a first, inner group and a second, outer group. The inner group comprises four seat portions 4a arranged along the circumference of a first, smaller circle that is coaxial to the central longitudinal axis of the central opening 2. The outer group comprises twelve seat portions 4b arranged along the circumference of a second, greater circle that is coaxial to the central longitudinal axis of the central opening 2. In the center of each of the seat portions 4a and 4b, an opening 5a and 5b, respectively, is provided through which air can be blown.

The clamping chuck 1 is provided, in the region of its conical inserting portion 3, with four openings 6 through which air can be blown. However, in FIG. 1, only two of the four openings 6 are visible. Moreover, the clamping chuck 1 is provided with a clamping mechanism, not shown in FIG. 1, for pulling in the clamping pin 11 and for fixing it in the clamping chuck. The outer side of the clamping chuck 1 is provided with two connectors 8 and 9, one adapted to be connected to a source of pressurized air for feeding air to the openings 5a, 5b and 6, the other one adapted to be connected to a pressurized medium for operating the clamping mechanism of the clamping chuck, as will be further explained herein after.

The clamping pin 11 attached to the work piece carrier 10 has a rear section, adjacent to the bottom surface 10a of the work piece carrier, comprising four exposed aligning surface portions 12, 12a. These exposed aligning surface portions 12, 12a are adapted to cooperate with the conical inserting portion 3 of the central opening 2 of the clamping chuck 1 to align the work piece carrier 10 with regard to the clamping chuck in X- and Y-directions, once the clamping pin 11 is inserted into the central bore 2. Each of the four aligning surface portions 12, 12a extend over a small fraction of the above mentioned rear section of the clamping pin 11 and project above the surface of that rear section. The sum of the surface areas of the four exposed aligning surface portions, thereby, amounts only to a fraction of the entire surface area of the conical inserting portion 3 of the central bore, resulting in high surface load on the exposed aligning surface portions 12, 12a upon clamping the work piece carrier 10 in the clamping chuck 1, thus reducing the sensitivity against contamination.

The four exposed aligning surface portions 12, 12a are evenly distributed around the periphery of the rear section of the clamping pin 11, whereby only two of them are visible in FIG. 1, i.e. the front portion 12 and one of the lateral portions 12a. The position of the air outlet openings 6 in the conical inserting portion 3 of the central bore 2 of the clamping chuck 1 corresponds to the location of the four exposed aligning surface portions 12, 12a of the clamping pin 11 such that each of the exposed aligning surface portions 12, 12a will face one of the air outlet openings 6 upon inserting the clamping pin 11 into the central bore 2 of the clamping chuck. Thus, by blowing air through the openings 6 during the inserting and clamping operation, the exposed aligning surface portions 12, 12a are pneumatically cleaned. It is understood that in the present case, with only one work piece carrier 10 and one clamping chuck 1, means have to be provided to determine the angular position of the work piece carrier 10 around the Z-axis upon inserting the clamping pin 11 into the central bore 2 to ensure that the exposed aligning surface portions 12, 12a really are located in front of the openings 6. Since suitable means are known in the art and readily available to any person skilled in the art, such means are neither shown in the drawings nor further explained.

Figure 2:
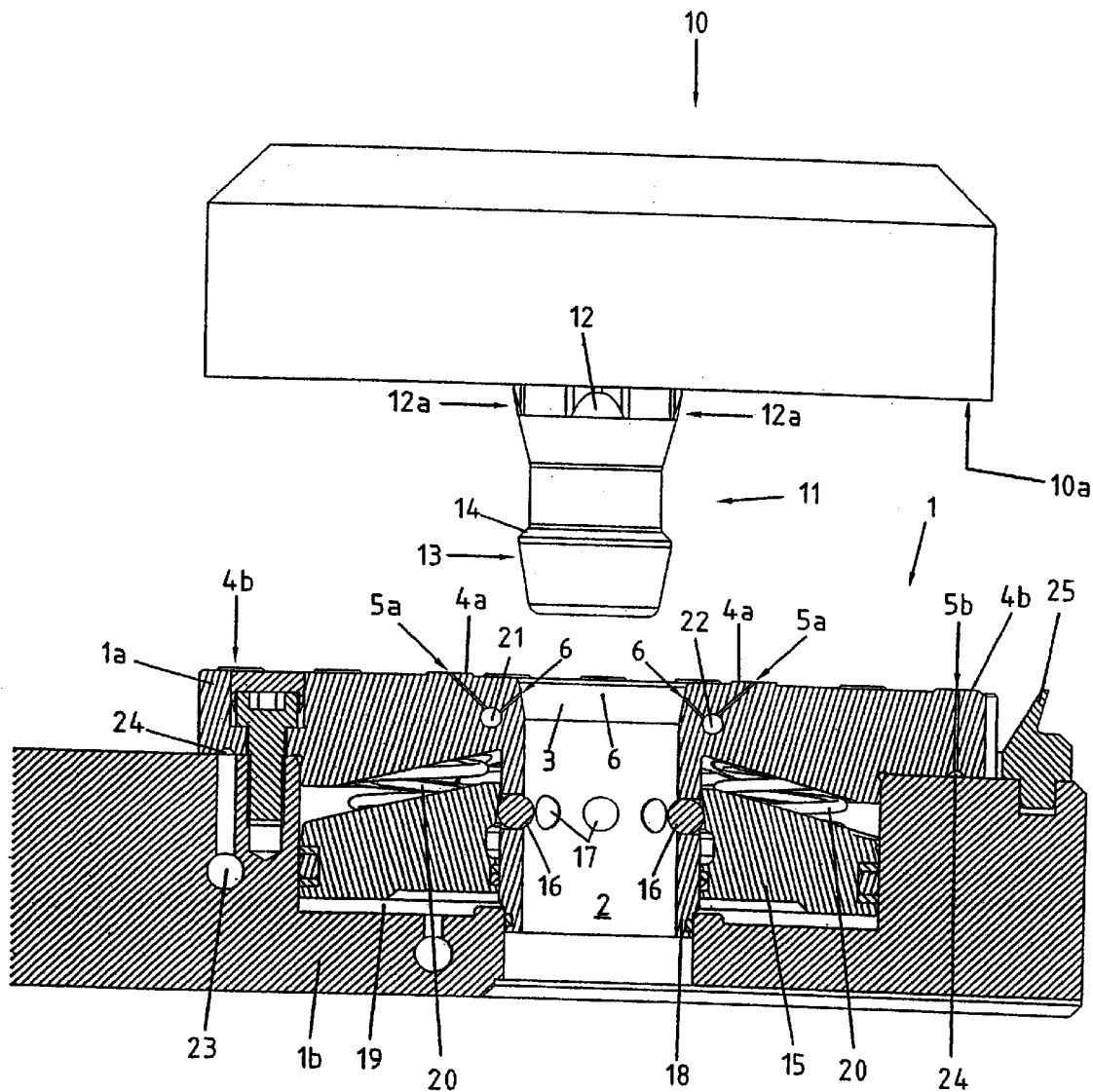
FIG. 2 shows a longitudinal sectional view of a clamping chuck and a side view of the work piece carrier.

In FIG. 2, the clamping chuck 1 is shown in a longitudinal sectional view and the work piece carrier 10 in a side view. The clamping chuck 1 comprises an upper portion 1a and a lower portion 1b. The lower portion 1b can be part of the worktable of a machining apparatus. The clamping mechanism for clamping the work piece carrier 10 to the clamping chuck 1 by means of the clamping pin 11 comprises a piston 15 biased by means of springs 20 and a plurality of clamping balls 16. The clamping balls 16 are received in radially extending bores 17 provided in a sleeve member 18, being part of the upper portion 1a of the clamping chuck and delimiting the central bore 2. In order to be able to move the piston 15, against the force of the springs 20, into its upper end position, a pressure chamber 19 is provided between the lower portion 1b of the clamping chuck 1 and the piston 15. The chamber 19 can be pneumatically or hydraulically pressurized.

The clamping pin 11 attached to the work piece carrier 10 comprises a head section 13 located at its front end (i.e. the lower end as seen in FIG. 2). The head section 13 has the shape of a truncated cone and exhibits a circumferential shoulder 14 located at its rear end (i.e. upper end as seen in FIG. 2). The clamping pin 11 having been inserted into the central bore 2 of the clamping chuck 1, the clamping balls 16 are radially pressed against this shoulder 14 to pull in and fix the clamping pin 11. The head section 13 of the clamping pin 11 serves for coarsely centering the clamping pin 11 in the central bore 2, while the exposed aligning surface portions 12, 12a at the rear section of the clamping pin take care of the fine positioning, i.e. upon essentially fully inserting the clamping pin 11 into the central bore 2, the exposed aligning surface portions 12, 12a rest on the conical inserting portion 3 of the central bore 2 to accurately determine the position of the clamping pin 11 with regard to the central bore 2 both in X- and Y-directions. In order to enable the clamping pin 11 to be inserted into the central bore 2 of the clamping chuck 1, the piston 15 has to be moved, against the force of the springs 20, into its upper end position; thereby, the clamping balls 16 can move radially outwards into a groove provided in the piston 15.

Once the clamping pin 11 has been inserted into the central bore 2 of the clamping chuck 1, the work piece carrier 10 loosely rests on the clamping chuck 1. In order to clamp the work piece carrier 10 to the clamping chuck 1, the pressure in the pressure chamber 19 is reduced, resulting in a downward movement of the piston 15 under the influence of the force of the springs 20. Thereby, in a manner known per se, the clamping balls 16 are radially moved inwards to rest on the shoulder 14 of the clamping pin 11 and, thereby, pull the latter one downwards, i.e. toward the clamping chuck 1. Under the influence of the high axial pulling force exerted on the clamping pin 11, up to 20 KN, both the clamping pin 11 is somewhat stretched lengthwise, resulting in a decrease of its outer diameter, and the conical inserting portion 3 of the central bore 2 is somewhat increased in diameter. Thus, the clamping pin 11 is pulled further into the central opening 2 until the flat bottom surface 10a of the work piece carrier 10 comes to rest on the seat portions 4a, 4b of the clamping chuck, the seat portions 4a, 4b thereby constituting a Z-stop. The result is that the work piece carrier 10 is aligned with regard to the clamping chuck 1 not only in X- and Y-directions, but also in Z-direction.

The dimensioning of the clamping pin 11 is chosen such that a gap with a width of between 0.01 to 0.02 mm exists between the seat portions 4a, 4b of the clamping chuck 1, serving as a Z-reference, and the flat bottom surface 10a of the work piece carrier 10 after fine centering, but before clamping the work piece carrier 10 to the clamping chuck 1, i.e. when the work piece carrier 10 rests only with its inherent mass on the clamping chuck 1. The elements of the clamping apparatus essential for the operation thereof are adjusted to each other, as far as dimensions and shape is concerned, in such a way that the reduction of the width of the gap between the flat bottom surface 10a of the work piece carrier 10 and the seat portions 4a, 5a of the clamping chuck 1 to zero, after the fine positioning of the clamping pin 11 and, therewith, the work piece carrier 10 in X- and Y-directions, is realized essentially exclusively with the help of the material elasticity of the clamping pin 11 as well as of the clamping chuck 1 in the region of the central opening 2. Thus, and in contrast to clamping apparatuses of the prior art, no members or elements that are elastically resilient in Z-direction have to be provided.

The upper portion 1a of the clamping chuck 1 comprises channels 21, 22 through which the openings 5a provided in the seat portions 4a as well as the openings 6 provided in the region of the conical inserting portion 3 can be supplied with pressurized air. In order to supply pressurized air to the openings 5b of the outer seat portions 4b, the bottom of the upper portion 1a of the clamping chuck 1 is provided with an annular channel 24. The annular channel 24 communicates with a bore 23. The bore 23 and the channels 21, 22 are interconnected by means of not further shown pipes and channels, respectively.

During the clamping operation of the work piece carrier 10, air is blown out of all the openings 5a, 5b and 6. That air cleans both the surface portions of the bottom 10a of the work piece carrier 10 which will rest on the seat portions 4a, 4b of the clamping chuck 1, and the aligning surface portions 12, 12a of the clamping pin 11. By virtue of the continuously decreasing gap between the openings 5a, 5b and the bottom 10a of the work piece carrier 10, and between the aligning surface portions 12, 12a of the clamping pin 11 and the conical inserting portion 3 of the clamping chuck 1 during the clamping operation, also the surface portions adjacent to the openings 6 are pneumatically cleaned. Due to the fact that both the Z-stop seat portions 4a, 4b and the aligning surface portions 12, 12a of the clamping pin 11 have but a limited surface area, a thorough cleaning of the related seat portions is ensured.

Laterally with regard to the clamping chuck 1, a gasket 25 is provided, projecting to a certain extent above the top of the clamping chuck 1; the purpose and mode of operation of this gasket 25 will be discussed in further detail herein after in connection with FIG. 3.

Figure 3:
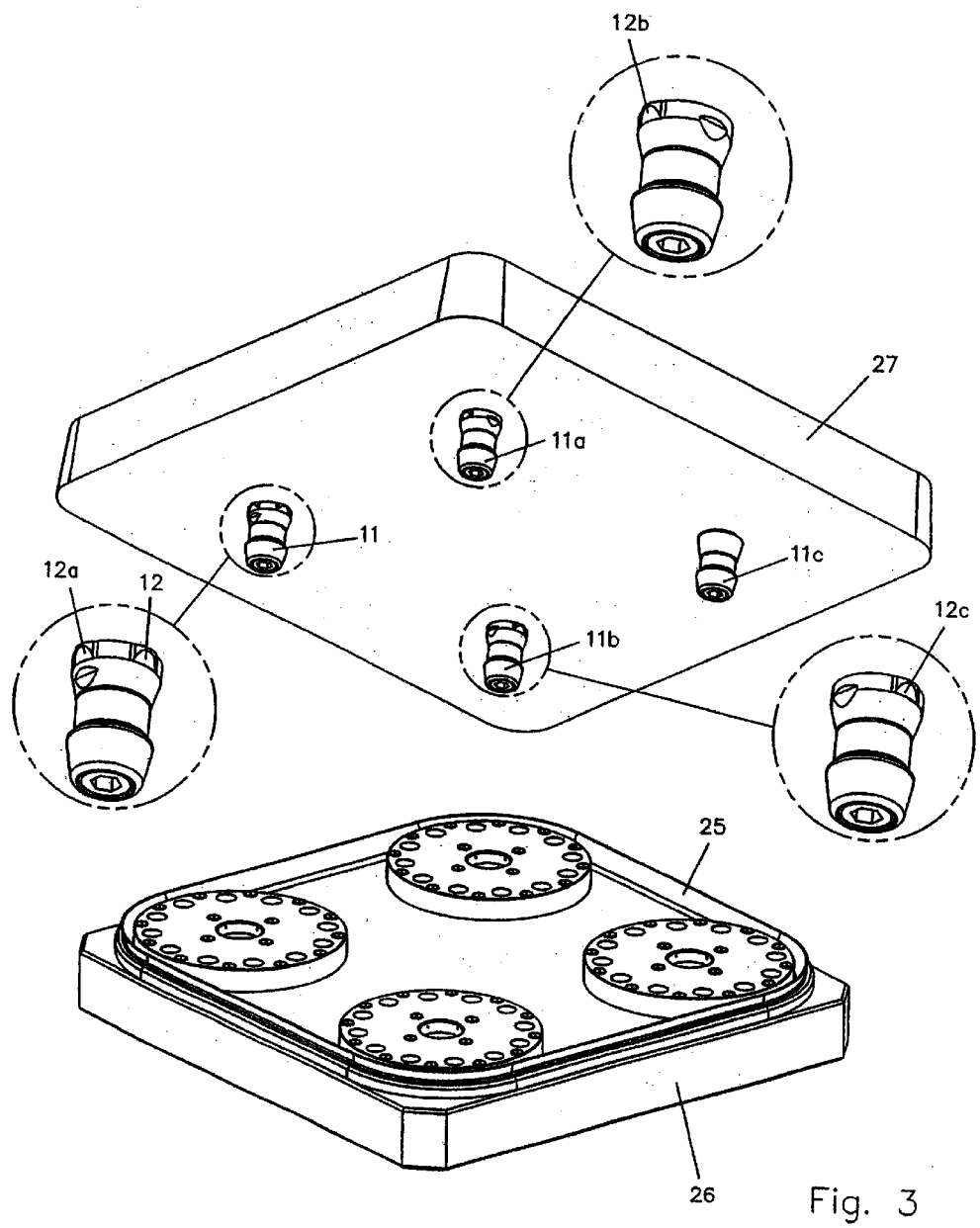
FIG. 3 shows a perspective view of a machining table and of a work piece carrier provided with four clamping pins.

FIG. 3 shows a perspective view of a machine tool table 26 provided with four clamping chucks as well as of a work piece carrier 27 provided with four clamping pins 11, 11a, 11b, 11c. Out of these four clamping pins 11, 11a, 11b, 11c, the left clamping pin 11, the front clamping pin 11a as well as the rear clamping pin 11b are separately shown in a somewhat enlarged, perspective view, besides the work piece carrier 27. Thereby, the left clamping pin 11 defines the origin, being provided with four exposed aligning surface portions 12, 12a for being positioned both in X- and Y-directions. However, only a front surface portion 12 and a lateral surface portion 12a are visible in FIG. 3. The front clamping pin 11a is provided with two exposed aligning surface portions 12b and serves for positioning the work piece carrier 27 along one of the two perpendicular axes, i.e. in X-direction. The rear clamping pin 11b is provided with two exposed aligning surface portions 12c again and serves for positioning the work piece carrier 27 along the other one of the two perpendicular axes, i.e. in Y-direction. The right clamping 11c, however, is not provided with any exposed aligning surface portions at all and serves only for clamping the work piece carrier 27 in Z-direction. Moreover, the outer peripheral gasket 25 is shown in FIG. 3, sealingly contacting the bottom surface of the work piece carrier 27, thus protecting the machine tool table together with its four clamping chucks from contamination.

For defining the origin, a clamping pin could be provided, having three exposed aligning surface portions, offset to each other by 120°, instead of the four exposed aligning surface portions 12, 12a offset to each other by 90°. Similarly, a clamping pin having more than four exposed aligning surface portions could be provided for defining the origin. However, the advantage of the design shown in FIG. 3 and discussed herein above may be seen in the fact that in a conical inserting portion 3 having four air outlet openings 6, both clamping pins having two aligning surface portions and clamping pins having four aligning surface portions can be cleaned.

What is claimed is:

1. A clamping apparatus, comprising:
   a clamping chuck;
   a work piece carrier adapted to be releasably connected to said clamping chuck;
   said work piece carrier having a flat bottom surface and comprising a clamping pin protruding from said flat bottom surface;
   said clamping chuck comprising a central opening for receiving said clamping pin of said work piece carrier, said central opening having a conical inserting portion;
   said clamping chuck further comprising a clamping mechanism for clampingly fixing said clamping pin of said work piece carrier in said central opening;
   said clamping pin comprising a rear section adjacent to said flat bottom surface of said work piece carrier having several exposed surface portions adapted to engage said conical inserting portion of said central opening for aligning the position of said clamping pin in X- and/or in Y-direction; and
   said clamping chuck having gas outlet openings located in said conical inserting portion of said central opening for blowing a gaseous medium against said exposed surface portions to thereby clean the surfaces thereof upon inserting said clamping pin into said central opening of said clamping chuck.

2. The clamping apparatus of claim 1, in which said rear section of said clamping pin is provided with two exposed surface portions, located diametrically opposite to each other, for aligning the position of said clamping pin in X- or in Y-direction.

3. The clamping apparatus of claim 1, in which said rear section of said clamping pin is provided with three exposed surface portions, located around said rear section and offset by 120° to each other, for aligning the position of said clamping pin in X- and in Y-direction.

4. The clamping apparatus of claim 1, in which said rear section of said clamping pin is provided with four exposed surface portions, located around said rear section and offset by 90° to each other, for aligning the position of said clamping pin in X- and in Y-direction.

5. The clamping apparatus according to claim 2 in which said exposed surface portions have the shape of a segment of a truncated cone.

6. The clamping apparatus of claim 1, in which the front end of the clamping pin remote from said work piece carrier comprises a front section constituting a coarse positioning means for the clamping pin with regard to the clamping chuck, while said exposed surface portions located on said rear section of said clamping pin constituting a fine positioning means for the clamping pin with regard to the clamping chuck.

7. The clamping apparatus of claim 1, said clamping chuck further comprising a plurality of seat portions constituting a Z-stop means for said work piece carrier, each of said seat portions being provided with a gas outlet opening for cleaning that areas of said flat bottom surface of said work piece carrier which will rest on said seat portions upon clamping said work piece carrier to said clamping chuck.

8. The clamping apparatus according to claim 7, in which said seat portions have a circular top surface.

9. The clamping apparatus of claim 1, in which said clamping pin is dimensioned such that, after having been centered with regard to the clamping chuck, is adapted to be elastically deformed upon activation of said clamping mechanism, utilizing the elasticity of the material of the clamping pin and/or the clamping chuck in the region of said central opening, to further pull in said clamping pin into said central opening, resulting in a further movement of said clamping pin in Z-direction.

10. A clamping apparatus, comprising:
    at least two clamping chucks;
    a work piece carrier adapted to be releasably connected to said clamping chucks;
    said work piece carrier having a flat bottom surface and comprising a plurality of clamping pins protruding from said flat bottom surface;
    said clamping chucks each comprising a central opening for receiving one of said clamping pins of said work piece carrier, said central opening having a conical inserting portion;
    each of said clamping chucks further comprising a clamping mechanism for clampingly fixing one of said clamping pins of said work piece carrier in said central opening;
    one of said clamping pins comprising a rear section adjacent to said flat bottom surface of said work piece carrier having at least three exposed surface portions adapted to engage said conical inserting portion of said central opening for aligning the position of said one clamping pin in X- and in Y-direction; and
    at least another one of said clamping pins comprising a rear section adjacent to said flat bottom surface of said work piece carrier having exposed surface portions adapted to engage said conical inserting portion of said central opening for aligning the angular position of said work piece carrier around the Z-axis perpendicularly extending through the intersection of said X- and Y-directions; whereby each of said clamping chucks comprising gas outlet openings located in said conical inserting portion of said central opening for blowing a gaseous medium against said exposed surface portions to thereby clean the surfaces thereof upon inserting said clamping pins into said central openings of said clamping chucks.

11. The clamping apparatus of claim 10, in which said at least another one of said clamping pins is adapted to align the work piece carrier only in X-direction or only in Y-direction, whereby said rear section of said at least another one of said clamping pins is provided with two diametrically opposite exposed surface portions.

12. The clamping apparatus according to claim 3 in which said exposed surface portions have the shape of a segment of a truncated cone.

13. The clamping apparatus according to claim 4 in which said exposed surface portions have the shape of a segment of a truncated cone.

* * * * *